3,023,227
5,7-SECO-B-NORANDROSTANE DERIVATIVES
Norman W. Atwater, Arlington Heights, Ill., assignor to G. D. Searle & Co., Chicago, Ill., a corporation of Delaware
No Drawing. Filed Nov. 4, 1959, Ser. No. 850,787
16 Claims. (Cl. 260—468)

The present invention relates to a new group of 5,7-seco-B-norandrostanes and, more particularly, to those which can be represented by the general structural formula

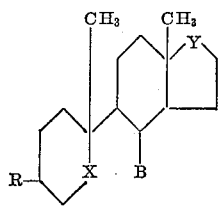

and the $\Delta^3$-dehydro derivatives thereof, wherein B is a member of the class consisting of COOH, COO-(lower)-alkyl, $CH_2OH$ and $CH_2O$—CO-(lower)alkyl radicals, R is a member of the class consisting of hydrogen and acyloxy radicals, X is a member of the class consisting of the carbonyl, hydroxymethylene, and lower-alkanoyloxymethylene radicals and wherein Y is a member of the class consisting of carbonyl, hydroxymethylene, benzoyloxymethylene, lower-alkanoyloxymethylene and cycloalkylcarbonyloxymethylene radicals.

In the foregoing structural formula the lower alkyl groups can be methyl, ethyl, branched and straight-chained propyl, butyl, amyl and hexyl groups. The lower alkanoyl groups can be those derived from acetic, propionic, butyric, valeric, caproic acid and the like.

Convenient intermediates for the preparation of the compounds of this invention are 3,17-diacyloxyandrost-5-en-7-ones of the general structural formula

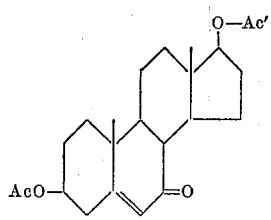

wherein Ac and Ac' represent aliphatic or aromatic acyl radicals. These compounds are subjected to the action of ozone and then of hydrogen peroxide to yield first the corresponding 3,17-diacyloxy-5-oxo-5,7-seco-B-norandrostan-7-oic acid. If the reaction is carried out in a lower alkanol, the corresponding lower alkyl esters are formed and if the operation is carried out under less mild conditions a 5-oxo-17β-acyloxy-5,7-seco-B-norandrost-3-en-7-oic acid is produced directly.

Catalytic hydrogenation in the presence of a palladium catalyst converts these acids to 5-oxo-17β-acyloxy-5,7-seco-B-norandrostan-7-oic acids. Reduction of the resulting acids with an alkali metal aluminum hydride produces 5,7-seco-B-norandrostane-5,7,17β-triol. A mixture of the 5α- and 5β-isomer is produced in which one isomer, which is presumably the 5β-hydroxy isomer, predominates. All three hydroxy groups can be acylated under vigorous conditions while treatment with anhydrides in pyridine at room temperature yields the 7,17-diacylated derivatives.

Seco-steroids of this invention have valuable pharmacological activities. Thus, they are anabolic and androgenic.

The seco-compounds of this invention are likewise useful as intermediates in the preparation of oxaandrostanes with anti-androgenic and anti-anabolic action. Thus, 5,7-seco-B-norandrostanes of the general structural formula

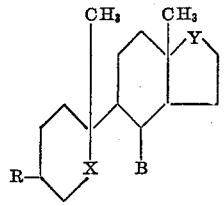

where B, R, and Y are defined as above and X is a carbonyl or hydroxymethylene radical can be converted to the oxaandrostanes of the general structural formula

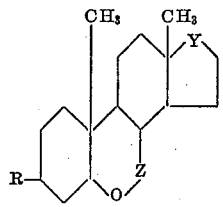

wherein R and Y are defined as above and Z is a carbonyl, hydroxymethylene or lower alkyloxymethylene radical.

The invention will appear in further detail from a consideration of the following examples which are given for the purpose of illustration only and are not to be construed as limiting the invention in spirit or in scope. In these examples, quantities of materials are indicated as parts by weight.

*Example 1*

To a mixture of 23 parts of 3β-acetoxy-17β-benzoyloxyandrost-5-ene, 180 parts of acetic acid and 105 parts of acetic anhydride are added 15.9 parts of anhydrous sodium chromate. The mixture is stirred at 35–45° C. for 5 days and then poured into ice water. The precipitate formed is filtered and dissolved in ethyl acetate. This solution is washed with water and a 5% aqueous sodium carbonate solution, dried over anhydrous sodium sulfate, and submitted to vacuum distillation. The remaining residue is crystallized from methanol to give 3β-acetoxy-17β-benzoyloxyandrost-5-en-7-one, melting at about 203–204° C. The compound has the structural formula

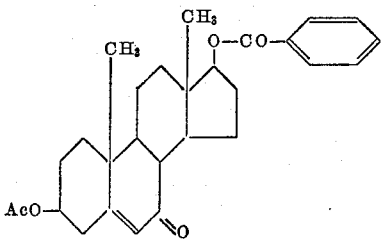

*Example 2*

A slow stream of oxygen containing a low percentage of ozone is passed through a solution of 5.55 parts of 3β-acetoxy-17β-benzoyloxyandrost-5-en-7-one and 75 parts of acetic acid and 75 parts of ethyl acetate at −10° C. until ozone is detected in the gas issuing from the reaction vessel. At a temperature of 25° C., 5 parts of 30% hydrogen peroxide and 10 parts of water are added and the mixture is allowed to stand for 16 hours at room temperature. Then 200 parts of ethyl acetate are added and the solution is extracted exhaustively with water and then with cold 3% sodium hydroxide. The basic extract is acidified with concentrated hydrochloric acid and extracted with ethyl acetate. The ethyl acetate extract is dried over anhydrous sodium sulfate and the solvent is removed by distillation. The remaining residue is chromatographed on 50 parts of silica gel and the column is developed with benzene solutions containing increasing concentrations of ethyl acetate. The fractions eluted with 20% ethyl acetate in benzene are crystallized from a mixture of ethanol and water to give 5-oxo-17β-benzoyloxy-5,7-seco-B-norandrost-3-en-7-oic acid melting at about 212.5–214.5° C. It has the structural formula

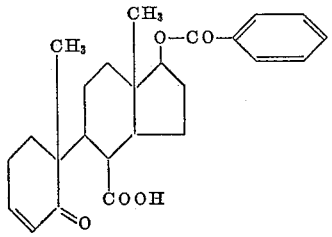

Example 3

A stream of oxygen containing a small percentage of ozone is passed into a solution of 50 parts of 3β-acetoxy-17β-benzoyloxyandrost-5-en-7-one, 1150 parts of dichloromethane and 330 parts of methanol at −78° C. until the solution assumes a pale blue color. At a temperature of 20° C., 10 parts of a 30% hydrogen peroxide solution and 20 parts of water are added. The mixture is allowed to stand for 16 hours. After the addition of 660 parts of dichloromethane, the solution is extracted with water and a 5% aqueous solution of potassium carbonate. The solvent is removed by vacuum distillation. The remaining residue is crystallized from 2-propanol and then from methanol to give methyl 3β-acetoxy-5-oxo-17β-benzoyloxy-5,7-seco-B-norandrostan-7-oate. The compound melts at about 170.5–172.5° C. and has the structural formula

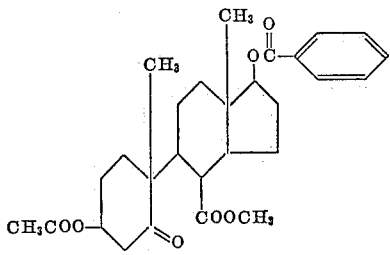

By substituting ethanol for methanol in the above procedure, ethyl 3β-acetoxy-5-oxo-17β-benzoyloxy-5,7-seco-B-norandrostan-7-oate is produced.

Example 4

A solution of 0.77 part of methyl 3β-acetoxy-5-oxo-17β-benzoyloxy-5,7-seco-B-norandrostan-7-oate and 35 parts of acetic acid is added to a suspension of 0.4 part of prereduced platinum oxide and 35 parts of acetic acid. The mixture is shaken in an atmosphere of hydrogen until 3 molecular equivalents of gas have been absorbed. After filtration to remove the catalyst, the filtrate is added to 1 liter of water to promote precipitation. The mixture is filtered and the precipitate crystallized from diisopropyl ether to yield methyl 3β-acetoxy-5-oxo-17β-cyclohexane-carboxy-5,7-seco-B-norandrostan-7-oate melting at about 181–186° C. The compound has the structural formula

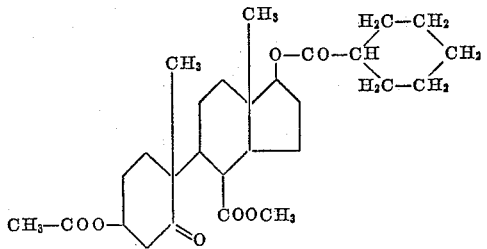

Example 5

A mixture of 5.0 parts of methyl 3β-acetoxy-5-oxo-17β-benzoyloxy-5,7-seco-B-norandrostan-7-oate, 350 parts of anhydrous methanol, and 50 parts of a saturated solution of anhydrous hydrogen chloride in methanol is refluxed for 24 hours. The mixture is poured into about 2 liters of a dilute ammonium hydroxide solution. This mixture is extracted exhaustively with dichloromethane. The combined extracts are washed with water, dried over anhydrous sodium sulfate, and distilled to dryness. The remaining residue is purified on a column containing 350 parts of silica gel which is developed with benzene solutions containing increasing concentrations of ethyl acetate. The material eluted with a mixture of 20% ethyl acetate in benzene is crystallized from diisopropyl ether to give methyl 5-oxo-17β-hydroxy-5,7-seco-B-norandrost-3-en-7-oate melting at about 159.5–161° C. The compound has the structural formula

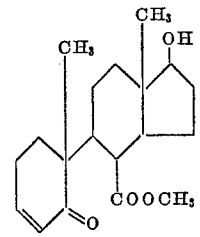

Example 6

A solution of 10 parts of methyl 5-oxo-17β-hydroxy-5,7-seco-B-norandrost-3-en-7-oate in 100 parts of pyridine is treated with 50 parts of acetic anhydride and the reaction mixture is allowed to stand at 25° C. for 16 hours. The reagents are removed by vacuum distillation and the residue is recrystallized from diisopropyl ether to give methyl 5-oxo-17β-acetoxy-5,7-seco-B-norandrost-3-en-7-oate having absorption maxima in the infra-red region at 5.79, 6.00 and 7.97 microns.

Substitution of 60 parts of propionic anhydride for the acetic anhydride in the foregoing example yields methyl 5-oxo-17β - propionoxy - 5,7 - seco - B - norandrost-3-en-7-oate of the structural formula

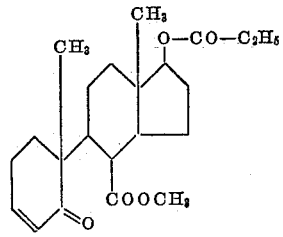

Example 7

A two phase mixture of 15 parts of methyl 3β-acetoxy-5-oxo-17β-benzoyloxy-5,7-seco-B-norandrostan-7-oate in 230 parts of dioxane and 8.6 parts of potassium hydroxide in 150 parts of water and 370 parts of dioxane is stirred rapidly at 25° C. for 20 minutes and then poured into 2 liters of water. The precipitate formed is filtered, washed with water and crystallized from a solution of acetone and water to give methyl 5-oxo-17β-benzoyloxy-5,7-seco-B-norandrost-3-en-7-oate melting at about 147–149° C. The compound has the structural formula

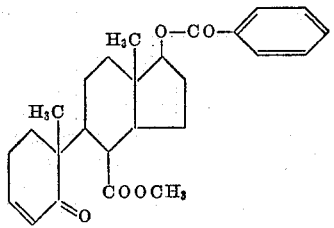

By substituting as a starting material ethyl 5-oxo-3β-acetoxy-17β-benzoyloxy - 5,7 - seco - B-norandrost-3-en-7-oate, there is obtained ethyl 5-oxo-17β-benzoyloxy-5,7-seco-B-norandrost-3-en-7-oate.

Example 8

A mixture of 2 parts of methyl 5-oxo-17β-benzoyloxy-5,7-seco-B-norandrost-3-en-7 oate in 100 parts of methanol and 0.2 part of 5% palladium on charcoal is shaken in an atmosphere of hydrogen until one molecular equivalent of hydrogen is absorbed. The catalyst is removed by filtration. The filtrate is vacuum distilled to a volume of about 30 parts. Upon cooling methyl 5-oxo-17β-benzoyloxy-5,7-seco-B-norandrostan-7-oate precipitates. The compound melts at about 170–171° C.

An alternate preparation of methyl 5-oxo-17β-benzoyloxy-5,7-seco-B-norandrostan-7-oate comprises the addition of 0.5 part of sodium borohydride in 20 parts of ethanol to 0.5 part of methyl 5-oxo-17β-benzoyloxy-5,7-seco-B-norandrost-3-en-7-oate and 60 parts of anhydrous ethanol. After 230 minutes the excess reducing agent is destroyed by the addition of acetic acid. The mixture is poured into 1 liter of water and the turbid solution is extracted with ether. The extracts are washed with water, dried over anhydrous sodium sulfate, and evaporated. The solid residue is crystallized from methanol to give the product melting at about 170–171° C.

On substituting an equivalent amount of methyl 5-oxo-17β-acetoxy-5,7-seco-B-norandrost-3-en-7-oate in either of the foregoing procedures for methyl 5-oxo-17β-benzoyloxy-5,7-seco-B-norandrost-3-en-7-oate, one obtains methyl 5-oxo-17β-acetoxy-5,7-seco-B-norandrostan-7-oate of the structural formula

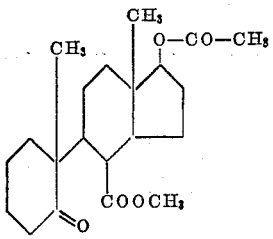

Likewise substitution of methyl 5-oxo-17β-propionoxy-5,7-seco-B-norandrostan-3-en-7-oate in this procedure yields methyl 5-oxo-17β-propionoxy-5,7-seco-B-norandrostan-7-oate.

Example 9

A mixture of 1.1 parts of methyl 5-oxo-17β-benzoyloxy-5,7-seco-B-norandrostan-7-oate in 90 parts of methanol and 3 parts of potassium hydroxide in 10 parts of water is refluxed for 4 hours. The mixture is acidified with dilute hydrochloric acid, diluted with 500 parts of water, and extracted with dichloromethane. The extract is washed with water and then submitted to vacuum distillation until the solvent is removed. The residue is crystallized from diisopropyl ether to yield 5-oxo-17β-hydroxy-5,7-seco-B-norandrostan-7-oic acid melting at about 228.5–230.5° C. The compound has the structural formula

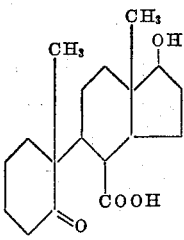

Example 10

A mixture of 1.2 parts of methyl 5-oxo-17β-benzoyloxy-5,7-seco-B-norandrostan-7-oate and 1 part of lithium aluminum hydride and 150 parts of tetrahydrafuran is refluxed for 24 hours. After the cautious addition of ethyl acetate to decompose the excess lithium aluminum hydride, twice the volume of dilute aqueous hydrochloric acid is added. The mixture is submitted to vacuum distillation to remove the tetrahydrafuran. The resulting slurry is extracted with trichloromethane. The extract is washed with water and evaporated. The residue is crystallized from ethyl acetate to give 5,7-seco-B-norandrostan-5,7,17β-triol melting at about 235–236° C. The compound has the structural formula

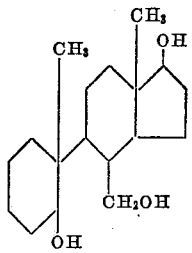

This compound may be alternatively prepared by the lithium aluminum hydride reduction of 5-oxo-17β-hydroxy-5,7-seco-B-norandrostan-7-oic acid using the procedure described above.

Example 11

A mixture of 3.2 parts of 5,7-seco-B-norandrostane-5,7,17β-triol in 50 parts of pyridine and 25 parts of acetic anhydride is allowed to stand for 16 hours at room temperature, poured into 500 parts of water and filtered. A precipitate is crystallized from petroleum ether to give 7,17β-diacetoxy-5,7-seco-B-norandrostan-5-ol melting at about 117.5–118.5° C.

Example 12

A mixture of 0.049 part of 5,7-seco-B-norandrostane-5,7,17β-triol, 0.049 part of toluenesulfonic acid monohydrate in 2.5 parts of acetic acid and 0.5 part of acetic anhydride is allowed to stand for 3 hours at room temperature, diluted with 10 parts of water, and filtered. The precipitate is crystallized from. a mixture of ether and petroleum ether to give 5,7,17β-triacetoxy-5,7-seco-B-norandrostane melting at about 145.5–149.5° C.

By substituting propionic acid and propionic anhydride for acetic acid and acetic anhydride in the above procedure, 5,17,17β-tripropionoxy-5,7-seco-B-norandrostane is formed which has the structural formula

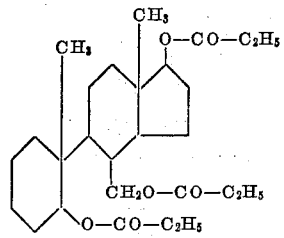

Example 13

A mixture of 0.8 part of 5-oxo-17β-hydroxy-androstan-7-oic acid in 150 parts of benzene and a large excess of diazomethane in ether is allowed to stand for 16 hours at room temperature. The solvent and the excess diazomethane are removed on a steam plate with a jet of nitrogen. The remaining residue is crystallized from a mixture of acetone and water to give methyl 5-oxo-17β-hydroxy-5,7-seco-B-norandrostan-7-oate melting at about 139.5–140.5° C.

Substitution in the foregoing example of diazoethane yields ethyl 5-oxo-17β-hydroxy-5,7-seco-B-norandrostan-7-oate of the structural formula

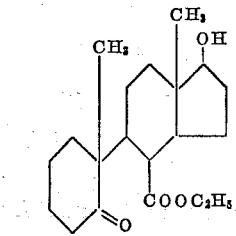

Example 14

A solution of 0.8 part of methyl 5-oxo-17β-hydroxyandrostan-7-oate in 10 parts of acetone is oxidized by the slow portionwise addition of an 0.8-N aqueous solution of chromium trioxide until a slight excess of the oxidizing agent has been added. After the addition of 0.1 part of 2-propanol, the mixture is filtered. The filtrate is evaporated. The remaining residue is crystallized from diisopropyl ether to give methyl 5,17-dioxo-5,7-seco-B-norandrostan-7-oate melting at about 171.5–174° C.

By substitution of 0.85 part of ethyl 5-oxo-17β-hydroxyandrostan-7-oate in the procedure above, there is obtained ethyl 5,17-dioxo-5,7-seco-B-norandrostan-7-oate. The compound has the structural formula

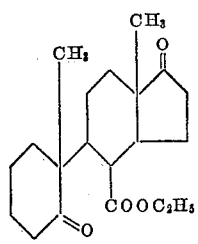

Example 15

To a solution of 1.72 parts of methyl 3β-acetoxy-5-oxo-17β-benzoyloxy-5,7-seco-B-norandrostan-7-oate in 60 parts of methanol is added a solution of 3 parts of sodium hydroxide in 15 parts of water. The mixture is refluxed for 4 hours, diluted with 350 parts of water, acidified with concentrated hydrochloric acid, and subjected to vacuum distillation to remove the methanol. The precipitate is collected on a filter. After recrystallization from diisopropyl ether, 17β-hydroxy-6-oxaandrostan-7-one exhibits a double melting point at about 149° C. and 161–162.5° C. It has the structural formula

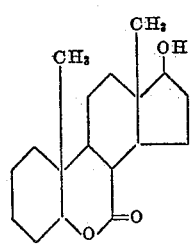

Example 16

To a solution of 0.02 part of 17β-hydroxy-6-oxaandrostan-7-one in 1 part of acetone is added an aqueous solution of 6-N chromic acid portionwise until an excess of the oxidant persists. After one minute 0.02 part of 2-propanol is added and the mixture is diluted to a volume of about 10 parts by the addition of cold water. The product is collected on a filter and dried to yield 6-oxaandrostane-7,17-dione, melting at about 161.5–162.5° C.

An alternate procedure for the preparation of this compound employs 5,7-seco-B-norandrostane-5,7,17β-triol instead of the starting material in the preceding paragraph. This compound is treated as above. After the dilution step the product is extracted with ethyl acetate. The extract is washed with cold saturated aqueous sodium chloride and then dried over anhydrous sodium sulfate. The solvent is removed by distillation. The oily residue is then purified by chromatographing on silica gel. The material eluted with a mixture of 5% ethyl acetate in benzene is recrystallized from diisopropyl ether to give 6-oxaandrostane-7,17-dione melting at about 161.5–162.5° C.

Example 17

A mixture of 4 parts of methyl 5-oxo-17β-benzoyloxy-5,7-seco-B-norandrostan-7-oate in 450 parts of anhydrous ethanol and 2 parts of sodium borohydride in 80 parts of anhydrous ethanol is allowed to stand for 6 hours at about 23° C. The excess reducing agent is then destroyed with acetic acid. The volume of the mixture is reduced to about 100 parts by vacuum distillation. The precipitate is collected on a filter, suspended and agitated with 100 parts of water, collected again on a filter, and recrystallized from methanol to give 17β-benzoyloxy-6-oxaandrostan-7-one, melting at about 199–201° C.

The compound can alternatively be prepared by treating an ester such as methyl 3β-acetoxy-5-oxo-17β-benzoyloxy-5,7-seco-B-norandrostan-7-oate or methyl 5-oxo-17β-benzoyloxy-5,7-seco-B-norandrost-3-en-7-oate by the foregoing procedure and further purifying the product on a silica gel chromatography column. The column is developed with benzene solutions containing increasing concentrations of ethyl acetate. The material eluted with a 5% solution of ethyl acetate in benzene is recrystallized from methanol to yield 17β-benzoyloxy-6-oxaandrostan-7-one melting at about 198–201° C. The compound has the formula

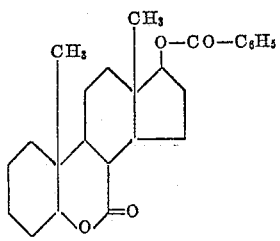

The material eluted by a 7% solution of ethyl acetate in benzene is recrystallized from methanol to yield 3β-acetoxy-17β-benzoyloxy-6-oxaandrostan-7-one melting at about 224–225.5° C. and 17β-benzoyloxy-6-oxaandrostan-7-ol melting at about 166–169° C. The latter compound has the structural formula

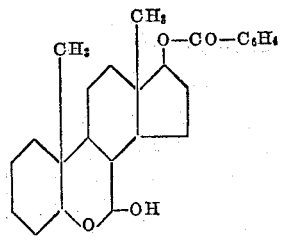

Elution with 10% ethyl acetate in benzene and recrystallization of the eluate from ethanol, yields 3β-acetoxy-17β-benzoyloxy-6-oxaandrostan-7-ol melting at about 201–202° C. The compound has the structural formula

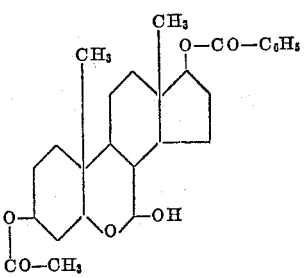

By substituting methyl 5-oxo-17β-acetoxy-5,7-seco-B-norandrostan-7-oate as starting material in the procedure of the first paragraph of this example, one obtains 17β-acetoxy-6-oxaandrostan-7-one having absorption maxima in the infra-red region at 5.76 and 7.98 microns.

Likewise, substituting methyl 5-oxo-17β-propionoxy-5,7-seco-B-norandrostan-7-oate as starting material in this procedure yields 17β-propionoxy-6-oxaandrostan-7-one of the structural formula

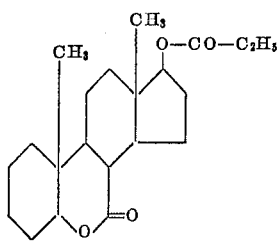

*Example 18*

A mixture of 0.1 part of 3β-acetoxy-17β-benzoyloxy-6-oxaandrostan-7-ol in 10 parts of methanol and 0.3 part of p-toluenesulfonic acid monohydrate is allowed to stand for one day at room temperature. A solution of 2 parts of sodium hydroxide in 3 parts of water is added to the mixture which is then refluxed for 5 hours, poured into 100 parts of water, and extracted with dichloromethane. The extract is evaporated and the residue is crystallized from diisopropyl ether to yield 7-methoxy-6-oxaandrostane-3β,17β-diol melting at about 124–130° C.

By substituting propanol for methanol in the above procedure, 7-propoxy-6-oxaandrostane-3β,17β-diol is obtained. The compound has the structural formula

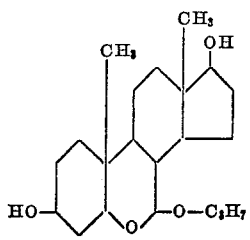

*Example 19*

A mixture of 0.7 part of 5-oxo-17β-hydroxyandrostan-7-oic acid, 5 parts of acetic anhydride, and 0.05 part of anhydrous sodium acetate is refluxed for 210 minutes and then evaporated to dryness by vacuum distillation. The residue is crystallized from diisopropyl ether to yield 17β-acetoxy-6-oxaandrost-4-en-7-one melting at about 151.5–152.5° C.

By substituting propionic anhydride and sodium propionate in the above procedure, 17β-propionoxy-6-oxaandrostan-4-en-7-one is obtained which has the structural formula

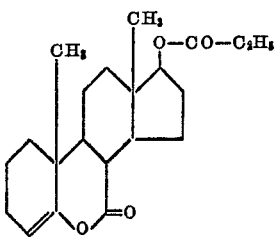

What is claimed is:
1. A compound of the structural formula

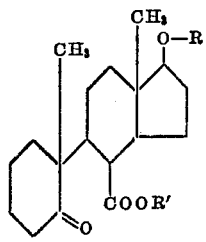

wherein R is a member of the class consisting of hydrogen, lower alkyl-CO—, and benzoyl radicals and R' is a member of the class consisting of hydrogen and lower alkyl radicals.

2. Methyl 5-oxo-17β-benzoyloxy-5,7-seco-B-norandrostan-7-oate.

3. 5-oxo-17β-hydroxy-5,7-seco-B-norandrostan-7-oic acid.

4. Methyl 5-oxo-17β-hydroxy-5,7-seco-B-norandrostan-7-oate.

5. A compound of the structural formula

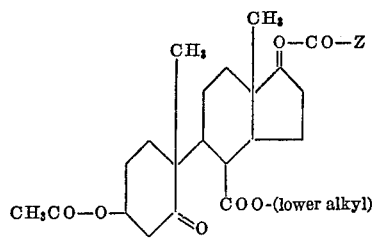

wherein Z is a member of the class consisting of phenyl and cyclohexyl radicals.

6. Methyl 3β-acetoxy-5-oxo-17β-cyclohexanecarboxy-5,7-seco-B-norandrostan-7-oate.

7. Methyl 5-oxo-3β-acetoxy-17β-benzoyloxy-5,7-seco-B-norandrostan-7-oate.

8. A lower alkyl 5,17-dioxo-5,7-seco-B-norandrostan-7-oate.

9. A compound of the structural formula

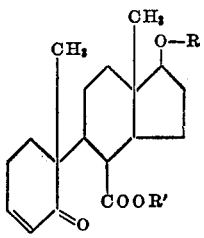

wherein R is a member of the class consisting of hydrogen, lower alkyl-CO, and benzoyl radicals and R' is a member of the class consisting of hydrogen and lower alkyl radicals.

10. 5-oxo-17β-benzoyloxy-5,7-seco-B-norandrost-3-en-7-oic acid.

11. Methyl 5-oxo-17β-hydroxy-5,7-seco-B-norandrost-3-en-7-oate.

12. Methyl 5-oxo-17β-benzyloxy-5,7-seco-B-norandrost-3-en-7-oate.

13. A compound of the structural formula

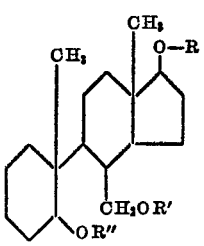

wherein R, R', and R" are members of the class consisting of hydrogen and (lower alkyl)-CO— radicals.

14. 5,7-seco-B-norandrostan-5,7,17β-triol.
15. 7,17β-diacetoxy-5,7-seco-B-norandrostan-5-ol.
16. 5,7,17β-triacetoxy-5,7-seco-B-norandrostane.

References Cited in the file of this patent
UNITED STATES PATENTS
2,886,589    Novello _____ May 12, 1959